June 6, 1939.  C. G. KRONMILLER  2,161,258

MOTOR OPERATED CONTROL MECHANISM

Filed Dec. 20, 1934

Inventor

Carl G. Kronmiller

By George H. Fisher

Attorney

Patented June 6, 1939

2,161,258

UNITED STATES PATENT OFFICE 2,161,258

MOTOR OPERATED CONTROL MECHANISM

Carl G. Kronmiller, Minneapolis, Minn., assignor to Minneapolis-Honeywell Regulator Company, Minneapolis, Minn., a corporation of Delaware Application December 20, 1934, Serial No. 758,415

4 Claims. (Cl. 236—84)

The present invention relates to motor operated control mechanism in which a single motor is utilized to operate a pair of devices.

One of the objects of the present invention is the provision of apparatus including a single motor which is connected to a first control device positively to operate the same in reverse directions upon reverse movements of the motor and is connected to a second control device through a one-way connection whereby the motor and first control device are enabled to move to a given position even though the second control device fails to move to a corresponding position.

A further object of the invention is the provision of apparatus including a motor means that is connected to a first control device positively to operate the same, and providing an operator for a second or auxiliary control device which has a portion lying in the path of movement of the motor means when moving in only one direction whereby the second or auxiliary control device is positively operated in only one direction.

The present invention has particular utility in connection with the control of a fuel valve and air damper, such, for instance, as a gas valve and well known associated secondary air damper which should be opened when the gas valve is opened. This is especially true wherein the motor means takes the form of a pressure motor having a single movable wall.

Another object of the invention, therefore, is the provision of a control mechanism by which a pressure motor having a single movable wall positively operates a first control device, such as a valve, in both directions and positively operates a second control device, such as a secondary air damper, in only one direction.

A more specific object of the invention is the provision of a pressure motor means that is connected to a first control device positively to operate the same in both directions and, upon movement in one direction only, is adapted to engage an operator for a second control device whereby the second control device is positively operated in only one direction and does not interfere with movement of the motor means in the other direction.

Other objects include the provision of improved automatic and manual control means for a pressure motor and the various combinations and sub-combinations disclosed in the drawing and described hereinafter, as well as those specifically pointed out in the claims.

For a further understanding of the invention, reference may be had to the following detailed description and accompanying drawing, in which.

Figure 3:
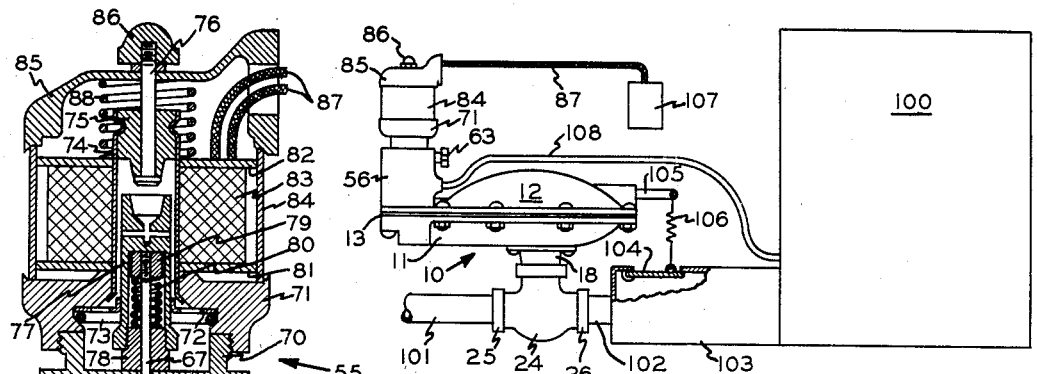
Fig. 3 is a showing of my novel control mechanism shown applied to a gas-fired heater and controlled by a conventional room thermostat.
Figure 1:
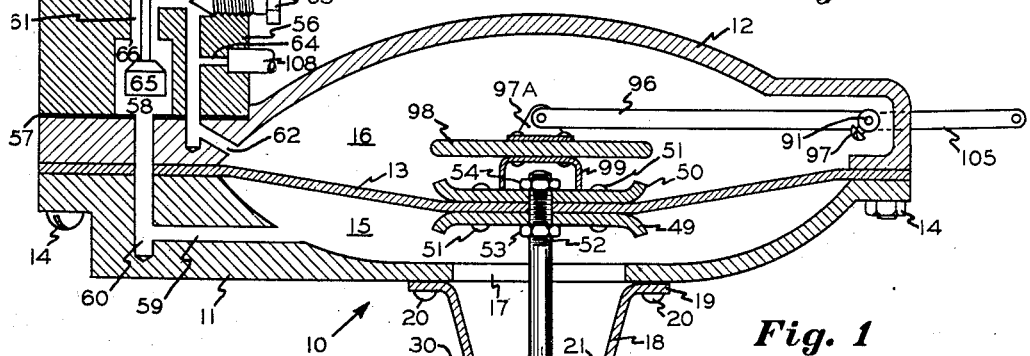
Fig. 1 is a sectional view of the pressure motor assembly and the control valve mechanism therefor.
Figure 2:
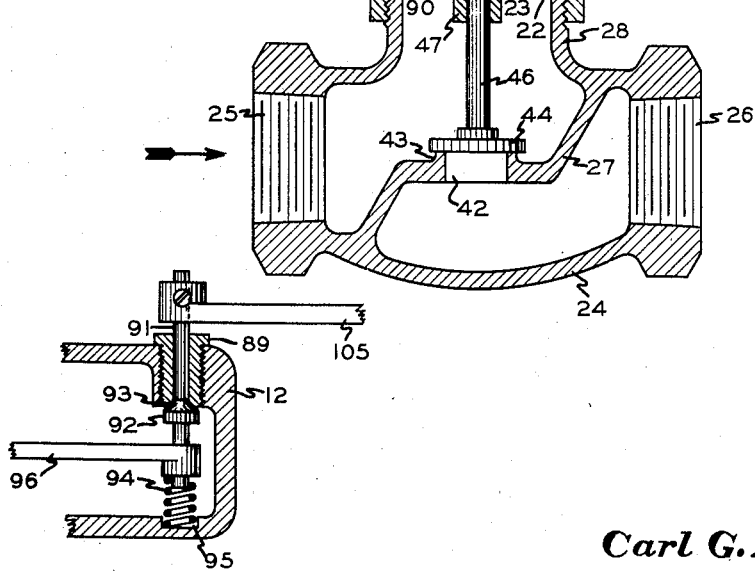
Fig. 2 is a detail of certain parts of the pressure motor shown in Fig. 1.

As to certain phases of the present invention, the type of motor mechanism utilized is not important but for the purpose of illustrating other phases of the invention I have herein disclosed a pressure motor which is generally indicated at 10. This pressure motor comprises a lower casting 11 and an upper casting 12, forming upper and lower casing members between which is secured a flexible diaphragm 13 by clamping the lower and upper castings 11 and 12 together through suitable means indicated at 14. The lower and upper castings 11 and 12 and the diaphragm 13 thereby form two pressure chambers 15 and 16.

The lower casting 11 is provided with a circular centrally located opening 17. A mounting bracket 18, having a flange 19, is secured to the underside of the lower casting 11 by means of screws 20. This mounting bracket 18 is provided with a circular horizontally disposed portion 21 to which a circular metallic disc 22 is secured as by rivets 23. A valve casing 24, provided with the usual inlet opening 25 and outlet opening 26 which are separated by a partition wall 27, is suitably secured to the disc 22 as will hereinafter appear. The valve casing 24 is provided with an upwardly extending cylindrical extension 28 that is provided with external screw threads which cooperate with the screw threads of a collar 29 that is provided with a flange 30 which partially overlies the disc 22. By this arrangement, the cylindrical extension 28 of valve casing 24 is firmly clamped against the disc 22 whereby the valve casing 24 is secured to the lower casting 11 in a fluid tight manner.

The partition wall 27 of the valve casing 24 is provided with a valve opening 42 that forms a valve seat 43. A valve disc 44 is adapted to cooperate with the valve seat 43 to permit or prevent the passage of fluid from the inlet 25 to the outlet 26. This valve disc 44 is carried by and secured to a valve stem 46 which extends upwardly through a valve stem guiding member 47 that passes through the circular disc 22 and circular portion 21 of bracket 18 and is suitably secured thereto. A pair of counter-weights 49 and 50 are disposed on opposite sides of diaphragm 13 and securely clamped thereto by means of rivets 51. The valve stem 46 is provided with a terminal threaded portion 52 which extends through the counter-weights 49 and 50 and diaphragm 13. A pair of nuts 53 and 54 cooperate with this terminally screw-threaded portion 52 of valve stem 46 to securely attach the valve stem 46 to the counter-weights 49 and 50 and the diaphragm 13. In this manner, reverse movements of the diaphragm 13 result in raising the valve disc 44 away from and lowering the same into engagement with the valve seat 43. The counter-weights 49 and 50 bias the diaphragm 13 or tend to move the same towards valve closed position.

The pressures in chambers 15 and 16 may be controlled in any desired manner so as to impart the desired movements to diaphragm 13 and are herein shown as controlled by an electrically operated control valve generally indicated at 55. The control valve 55 includes a control valve casting 56 that is suitably secured to the upper casting 12, there preferably being a sealing gasket 57 interposed between the control valve casting 56 and the upper casting 12. This casting 56 is provided with a control chamber 58 which communicates with the chamber 15 by means of passages 59 and 60 that are formed in the lower and upper castings 11 and 12. The control chamber 58 further communicates with the upper chamber 16 by means of passages 61 and 62 which are respectively formed in the control valve casting 56 and the upper casting 12. The passage 61 may be manually closed off by means of a manually operable needle valve 63 for a purpose which will become apparent hereinafter. The passage 61 further communicates with a restricted passage 64 that is formed in the control valve casting 56 and extends to an exterior wall of the same.

A valve head 65 is located in the control chamber 58 and is adapted normally to assume the position shown wherein the control chamber 58 and the passage 61 are in communication. However, when the valve head 65 is raised, it cooperates with a valve seat 66 formed by the passage 61 and the control chamber 58 so as to interrupt communication between the passage 61 and the control chamber 58. The valve head 65 is secured to a valve stem 67 which extends upwardly through the control valve casting 56 and terminates thereabove.

The valve stem 67 is controlled by an electromagnetic controlling mechanism which will now be described. The control valve casting 56 is provided with an upwardly extending annular portion 70 that is externally screw-threaded and upon which a casting 71 is screw-threaded. This casting 71 supports a circular spring washer 72 that is held in place by means of a circular spring clip 73. The casting 71 further supports an upwardly extending non-magnetic tubular member 74, the upper end of which is closed by means of a non-magnetic plug 75 having a magnetic screw 76 extending therethrough. Located in this tubular member 74 is an armature 77 that is provided with an internal bore that screw-threadedly receives a plug 78. The valve stem 67 extends through this plug 78 in slidable relation thereto and terminates within the bore formed in the armature 77. A collar 79 is secured to the upper end of the valve stem 67 and a coiled spring 80 is interposed between the collar 79 and plug 78 whereby the collar 79 is normally held in engagement with the plunger 77. A pair of magnetic steel discs 81 and 82 are placed upon the tubular member 74 and an electromagnetic coil 83 is located therebetween. A cylindrical housing member 84 surrounds the discs 81 and 82 and electromagnetic coil 83 and is firmly clamped against the casting 71 by means of a casting 85 which is held in place by a nut 86 that cooperates with the terminal portion of screw 76. A coiled spring 88 is interposed between casting 85 and the upper disc 82 to firmly hold the discs 81 and 82 and the electromagnetic coil 83 against the casting 71. The electromagnetic coil 83 is provided with electrical lead wires 87. For further details of the structure of this electromagnetic operator for the valve stem 67, reference may be had to the copending application of Willis H. Gille, Serial No. 740,547, filed August 20, 1934.

The inlet opening 25 is adapted to be connected to a source of fluid and this fluid is arranged to communicate with the chamber 15 at all times through any suitable means. This is accomplished in the present embodiment of the invention by providing an opening 90 through the circular disc 22 and the circular portion 21 of the bracket 18. With the parts in the position shown, this pressure is transmitted to chamber 16 by means of passages 59 and 60, control chamber 58 and passages 61 and 62. The pressure in chamber 16 is relieved slightly because of the restricted passage 64 which connects to passages 61 and 62, but the pressures in chambers 15 and 16 are substantially equal. The diaphragm 13 therefore assumes the position shown in the drawing by reason of counter-weights 49 and 50 and the weight of valve stem 46 and valve disc 44, the weight of these parts being sufficient to overcome the slightly higher pressure in chamber 15. The valve disc 44 is therefore in engagement with the valve seat 43 and prevents the flow of fluid from the inlet 25 to the outlet 26. If the valve stem 67 now be raised so as to bring valve head 65 into engagement with the valve seat 66, thereby interrupting communication between the control chamber 58 and the passage 61, the fluid can no longer pass from chamber 15 into the chamber 16. Fluid will then bleed from the chamber 16 so that the pressure in chamber 16 is exhausted or materially reduced below the pressure in chamber 15. This difference in pressure acts upon the underside of diaphragm 13 and lifts the same upwardly to move the valve disc 44 from engagement with valve seat 43. Fluid is thereby permitted to flow from the inlet 25 to the outlet 26. If the valve stem 67 again be lowered so as to return the valve head 65 to the position shown in the drawing, the pressures in chambers 15 and 16 are again substantially equalized. The diaphragm 13 therefore moves downwardly under the influence of counter-weights 49 and 50 and the weight of valve stem 46 and valve disc 44 whereby the valve disc 44 again engages the valve seat 43 to interrupt communication through the valve opening 42. The manually operable needle valve 63 may be utilized to close off the passage 61 so as to move the valve disc 44 away from the valve seat 43 even though the valve head 65 be in the position shown in the drawing as the result of a failure of electrical power or the like.

It is often desired to operate an auxiliary device by the same motor mechanism that operates the main controlling valve. To accomplish this result, the present invention includes auxiliary operating mechanism that includes a shaft 91 which extends through a bushing 89 threaded into the upper casting 12, the outer end of shaft 91 terminating exteriorly of casting 12 while the other end terminates within the chamber 16.

The shaft 91 is provided with an enlarged portion 92 and a conically shaped portion 93 which joins the enlarged portion 92 and the main portion of shaft 91. This conical portion 93 is pressed into engagement with a suitably counter-bored portion of the bushing 89 by means of a coiled spring 94. In this manner, a fluid tight joint is provided while permitting of rotation of the shaft 91. One end of the spring 94 abuts the casting 12 which may be provided with a hole 95 for receiving this end of the spring. The other end of spring 94 surrounds the terminal portion of shaft 91 and abuts a lever 96 which is secured to shaft 91 by means of a set screw 97. This lever 96 terminates substantially in the center of chamber 16 and is pivoted to a bracket 97A that is secured to a counter-weight 98. The underside of counter-weight 98 preferably carries a cup-shaped stop member 99 to limit the downward movement of counter-weight 98 and therefore limit the counter-clockwise rotative movement of the lever 96 and shaft 91.

It will be seen by this construction that the lever 96 and shaft 91 are normally biased to the positions shown in drawings. When the pressure in chamber 15 is substantially increased over that in chamber 16 in any of the manners previously described, the upward movement of diaphragm 13 causes the counter-weight 98 to be lifted whereupon lever 96 and shaft 91 are rotated in a clockwise direction. When the pressures in chambers 15 and 16 are then subsequently equalized so that diaphragm 13 moves downwardly, the lever 96 and shaft 91 should rotate in counter-clockwise direction under the influence of counter-weight 98. However, it will be noted that the connection between the diaphragm 13 and the lever 96 is a one-way connection, permitting downward movement of the diaphragm 13 even though the lever 96 or the control device to which the shaft 91 is to be secured should stick or otherwise prevent counter-clockwise rotative movement of lever 96 and shaft 91.

In Fig. 3, the control mechanism of the present invention is shown applied to a gas-fired heater 100. The inlet 25 of the valve casing 24 is connected to a gas supply pipe 101. The outlet 26 thereof is connected to a burner (not shown) located in the heater 100 by a pipe 102. This pipe 102 passes through the usual secondary air housing 103 that is provided with a secondary air damper 104. This secondary air damper 104 is biased by its weight to open position and is connected to the shaft 91 through the medium of a secondary air damper lever 105 and connecting means 106. The lead wires 87 for the electromagnetic coil 83 are shown as connected to a conventional room thermostat 107 whereby the energization and deenergization of electromagnetic coil 83 is controlled by changes in room temperature, the room in turn being heated by the heater 100. A pipe 108 has one of its ends connected to the passage 64 of the control valve casting 56 and its other end may be utilized to conduct the gas exhausted from the chambers 15 and 16 to any desired point of disposal and is herein shown as leading this exhausted gas into the heater 100 where it may be consumed or otherwise disposed of.

The operation of the system of Fig. 3 will be readily apparent from the foregoing description. Briefly, upon a call for heat by the room thermostat 107, the electromagnetic coil 83 is energized and lifts valve head 65 into engagement with valve head 66 by means of the plunger 77 and strain relief spring 80. Communication is thereupon established between gas supply pipe 101 and the burner (not shown) and this gas may be ignited in any of the usual manners well known in the art. The consumption of the gas generates heat which restores the temperature of the room in which the room thermostat 107 is located whereupon the electromagnetic coil 83 is deenergized. The valve head 65 therefore returns to the position shown in the drawing whereupon communication between gas supply pipe 101 and the burner is interrupted. All of the gas exhausted from the chambers 15 and 16 is led to the heater 100 by the pipe 108 for consumption or disposal in any other manner. Opening movement of the main valve is accompanied by downward movement of the air damper lever 105 which allows the secondary air damper 104 to open. Likewise, closing of the main valve should result in closure of the secondary air damper 104 by reason of the counter-weight 98. But if the secondary air damper 104 should stick, or if for any other reason the counter-weight 98 is unable to return the secondary air damper 104 to closed position, it will be evident that such failure of the counter-weight 98 to follow up the downwardly moving diaphragm 13 will not in any manner effect the operation of the main valve.

The provision of the chamber 16 and the connections by which it is continuously exhausted to some desired point provides for the safe disposal of any gas which may flow from the chamber 15 directly to the chamber 16 for any reason and especially in case of rupture of the diaphragm 13.

While only a single specific modification of the invention has been herein disclosed, it is to be understood that this is merely illustrative of one of many forms which this invention may take and I therefore intend to be limited only by the scope of the appended claims.

I claim:

1. In combination, a sealed pressure motor means including a movable wall, a valve connected to and operated by said movable wall, a rotatable shaft passing through a wall of said pressure motor, said shaft comprising a conical head located within the chamber with the conical surface thereof facing said aperture, means resiliently urging said conical head into engagement with the edge of said aperture to seal against the escape of fluid while permitting rotation of said shaft, and a lever located within the pressure motor means secured to said shaft and having a portion in the path of movement of said movable wall whereby said shaft will be rotated upon movement of said movable wall in one direction.

2. In combination, lower and upper casings, a diaphragm sealed therebetween to form an upper pressure chamber, a valve casing secured to said lower casing and forming a lower pressure chamber with the lower casing and diaphragm, a valve in said valve casing, connections between said valve and diaphragm so that upon downward movement of said diaphragm, said valve is moved to a closed position and upon upward movement thereof, said valve is moved to open position, an actuating member having a portion pivotally mounted within said upper casing, yieldable means urging said portion of said actuating member into engagement with said diaphragm so that upon upward movement of said diaphragm, said portion of the actuating member is positively moved upwardly and upon downward movement of the diaphragm, said actuating member is moved downwardly only by the action of yieldable means.

3. In combination, a burner, a fuel valve in control of the flow of fuel to the burner, a damper controlling the flow of air to the burner, said damper being biased to an open position, a pressure motor including a movable wall, said fuel valve being located below the movable wall and adapted to close on downward movement of said wall and open on upward movement of the wall, a pivotally mounted damper actuating lever comprising an arm having a portion in the path of movement of said wall, means yieldably urging said portion of said arm into engagement with said wall, connections between said actuating arm and said damper so that upon upward movement of said movable wall to open said valve, the positive movement of the actuating arm caused by said upward movement permits the damper to open and upon downward movement of said movable wall to close the valve, the movement of the actuating arm caused by said yieldable means normally moves the damper to a closed position.

4. In combination, lower and upper casing members, a diaphragm sealed therebetween to form upper and lower pressure chambers, a valve casing secured to said lower casing, a valve in said valve casing, connections between said valve and diaphragm such that movement of said diaphragm by reason of a change in the pressure differential on opposite sides thereof causes movement of said valve between open and closed positions whereby said diaphragm, said valve, and said connections therebetween form a movable assembly, a damper actuating lever pivotally extending through one of said casing members and having a substantial portion thereof pivotally movable within said casing member, yieldable means urging said portion of said actuating lever into engagement with a portion of said movable assembly so that upon movement of the diaphragm in one direction, said portion of the actuating lever is positively moved in the same direction and upon movement of the diaphragm in the other direction, said portion is moved in said other direction only by the action of said yieldable means.

CARL G. KRONMILLER.